United States Patent [19]

Moriya et al.

[11] Patent Number: 4,839,423
[45] Date of Patent: Jun. 13, 1989

[54] METHOD FOR PRODUCTION OF GRAFT RESIN COMPOSITION

[75] Inventors: Yasuo Moriya; Nobuyoshi Suzuki; Hiroshi Goto, all of Aichi, Japan

[73] Assignee: Nippon Oil & Fats Co., Ltd., Tokyo, Japan

[21] Appl. No.: 204,263

[22] Filed: Jun. 9, 1988

[30] Foreign Application Priority Data

Jun. 16, 1987 [JP] Japan .................. 62-147837
Jun. 16, 1987 [JP] Japan .................. 62-147838

[51] Int. Cl.$^4$ .................. C08L 255/02; C08L 51/06
[52] U.S. Cl. .................. 525/80; 525/277; 525/303; 525/312; 525/322; 525/263; 525/70; 525/79
[58] Field of Search .................. 525/277, 303, 80

[56] References Cited

U.S. PATENT DOCUMENTS

| | | | |
|---|---|---|---|
| 4,376,897 | 3/1983 | Matsubara et al. | 525/303 |
| 4,753,990 | 6/1988 | Moriya et al. | 525/94 |
| 4,774,293 | 9/1988 | Beijleveld et al. | 525/298 |

FOREIGN PATENT DOCUMENTS 60-011349 1/1985 Japan .
60-013828 1/1985 Japan .

OTHER PUBLICATIONS

Chem Abstracts 103:7265u Polyolefin Mixtures (Showa) vol. 103, 1985.
Chem Abstracts 107:23831p vol. 107, 1987.

*Primary Examiner*—Carman J. Seccuro
*Attorney, Agent, or Firm*—Oblon, Spivak, McClelland, Maier & Neustadt

[57] ABSTRACT

A graft precursor is formed by preparing a propylene polymer suspension having a propylene polymer suspended in water and a solution having a specific radically (co)polymerizable organic peroxide and a specific radical polymerization initiator dissolved in specific amounts in a vinyl monomer, mixing the propylene suspension and the solution in a specific ratio, heating and stirring the resultant mixture under conditions incapable of inducing substantial decomposition of the polymerization initiator, and further elevating the temperature of the mixture after the total amount of the vinyl monomer, the radically (co)polymerizable organic peroxide, and the radical polymerization initiator has decreased to less than 50% by weight of the initial total amount. Then a graft resin composition is produced by melting and kneading the graft precursor, either by itself or in combination with a propylene polymer and a vinyl polymer, at a temperature in the range of 100° to 300° C. thereby effecting a grafting reaction of the mixture.

12 Claims, No Drawings

METHOD FOR PRODUCTION OF GRAFT RESIN COMPOSITION

BACKGROUND OF THE INVENTION

1. Field of the Invention

This invention relates to a method for the production of a graft resin composition having a vinyl compound grafted to a propylene polymer useful as adhesive agent, coating agent, modifying agent, micro-dispersing agent, polymer-alloying agent, functional forming material, and macromolecular compatibility-imparting agent.

2. Prior Art Statement

Heretofore, for the purpose of imparting improved rigidity, dimensional stability, and printability, for example, upon the propylene polymer as a molding material, an attempt has been made at adding to the propylene polymer a vinyl polymer such as, for example, polystyrene and further an organic peroxide as a crosslinking agent or a grafting agent and blending them in a molten state (Japanese Patent Public Disclosure No. SHO 61(1986)-127714).

A propylene polymer has been proposed which is produced by a method of graft polymerizing styrene onto a propylene polymer through the agency of an ionizing radiation. This method has been found to be fairly effective in uniformly dispensing polystyrene in the propylene polymer.

The method of solution graft polymerization which makes use of such a solvent as xylene or toluene and the method of emulsion graft polymerization are also known to the art.

It has been also proposed to produce a graft resin composition by impregnating propylene polymer particles with a vinyl monomer and polymerizing the impregnated particles in an aqueous suspension system (Japanese Patent Publication SHO 58(1983)-53003). This method produces better results than the other methods, as shown by the fact that the resin composition obtained in consequence of the polymerization has the vinyl polymer uniformly distributed therein.

These methods have faults of their own as follows.

The propylene polymer and a styrene type polymer are substantially incompatible with each other. Even an attempt at blending these two polymers in the presence of an organic peroxide as a grafting agent brings about absolutely no grafting effect. In the cicumstances, the practice of using more than 10% by weight of a styrene type polymer in the blend has never been realized. Generally, the blend has barely permitted incorporation therein of 0.2 to 5% by weight of a styrene type polymer. Even when the blend incorporates the styrene type polymer in such a small amount as described above, the shaped article made of this blend exhibits insufficient shock resistance and possesses poor appearance because the two component polymers have substantially no compatibility with each other.

Since the exposure of the polymerization system to the ionizing radiation must rely on a special process called the radiation graft polymerization method, it is not fully feasible from the economic point of view. Further since the reaction induced by this method occurs only in the surface region of the whole mass of the reaction system, the amount of styrene to be introduced into the produced blend has its limit.

In the solution graft polymerization method, because of the solubility of the propylene polymer, the propylene polymer must undergo polymerization as diluted with a large volume of a solvent. This method, therefore, has the disadvantage that the chance for mutual contact among the vinyl monomer, the polymerization initiator, and the propylene polymer is small and the efficiency of reaction of vinyl monomer is poor. It also proves to be disadvantageous economically because aftertreatments such as for recovery of solvent are complicated. In the case of the method of emulsion graft polymerization, since the reaction is limited to the surface region of the propylene polymer particles, this method has a disadvantage that the product thereof suffers from poor homogeneity.

By the polymerization which is carried out in an aqueous suspension system, there is obtained a resin composition in which the vinyl polymer is thoroughly dispersed. This resin composition, however, does not necessarily enjoy appreciably high grafting efficiency because the composition is formed mainly by physical entanglement of the propylene polymer and the vinyl polymer. When the resin composition is heated or caused to contact a solvent in the course of secondary fabrication, therefore, the vinyl polymer particles uniformly dispersed in the resin composition tend to undergo secondary agglomeration. This adverse phenomenon is a serious problem when the resin composition is to be used as a functional molding material or as a macromolecular compatibility-imparting agent.

The inventors conducted a study in search of a method for the production of a resin composition having a propylene polymer and a vinyl polymer dispersed in a matrix in such a manner that the polymer components of the dispersed phase thereof will exhibit a high grafting efficiency to the matrix component and will refrain from undergoing secondary agglomeration in the course of the secondary fabrication of the resin composition. They have consequently found that the graft resin composition aimed at can be obtained by first preparing a specific graft precursor and then causing the graft precursor, either directly or subsequently to addition thereto of a specific polymer, to be kneaded in a melted state. This invention has been perfected as a result.

OBJECT AND SUMMARY OF THE INVENTION

Specifically, this invention is directed to a method for the production of a graft resin composition, characterized by the steps of:

a. suspending a propylene polymer in water thereby obtaining a propylene polymer suspension, b. then dissolving in a vinyl monomer 0.1 to 10 parts by weight, based on 100 parts by weight of the vinyl monomer, of at least one member selected from the group consisting of radically (co)polymerizable organic peroxides represented by the formula:

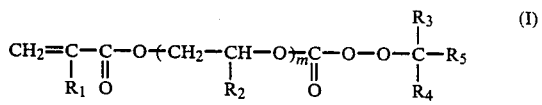

$$CH_2=C-C-O(CH_2-CH-O)_m C-O-O-C-R_5$$
$$\phantom{CH_2=}|\phantom{-}\|\phantom{-O(CH_2-}|\phantom{-CH-O)_m}\|\phantom{-O-O-}|$$
$$\phantom{CH_2=}R_1\phantom{-}O\phantom{-O(CH_2-}R_2\phantom{-CH-O)_m}O\phantom{-O-O-}R_4$$

(with $R_3$ above $R_5$)

wherein $R_1$ stands for a hydrogen atom or an alkyl group of 1 or 2 carbon atoms, $R_2$ for a hydrogen atom or a methyl group, $R_3$ and $R_4$ independently for an alkyl group of 1 to 4 carbon atoms, $R_5$ for an alkyl group of 1 to 12 carbon atoms, a phenyl group, or an alkyl-substituted phenyl group or a cycloalkyl group of 3 to 12 carbon atoms, and m for 1 or 2, and radically (co)- polymerizable organic peroxides represented by the formula:

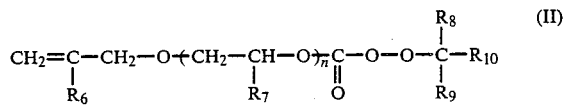

wherein $R_6$ stands for a hydrogen atom or an alkyl group of 1 to 4 carbon atoms, $R_7$ for a hydrogen atom or a methyl group, $R_8$ and $R_9$ independently for an alkyl group of 1 to 4 carbon atoms, $R_{10}$ for an alkyl group of 1 to 12 carbon atoms, a phenyl group, or an alkyl-substituted phenyl group or a cycloalkyl group of 3 to 12 carbon atoms, and n for 0, 1, or 2, and 0.01 to 5 parts by weight, based on 100 parts by weight of the total of the vinyl monomer and the radically polymeric organic peroxide, of a radical polymerization initiator possessing a half life of 10 hours and exhibiting a decomposition temperature in the range of 40° to 90° C., c. mixing the resultant solution of b with the propylene polymer suspension in a ratio of 5 to 400 parts by weight of the vinyl monomer to 100 parts by weight of the propylene polymer thereby forming an aqueous suspension, d. heating the aqueous suspension under conditions incapable of inducing substantial decomposition of the radical polymerization initiator thereby enabling the propylene polymer to be impregnated with the vinyl monomer, the radically (co)polymerizable organic peroxide, and the radical polymerization initiator, e. elevating the temperature of the aqueous suspension after the amount of the vinyl monomer, the radically polymeric organic peroxide, and the radical polymerization initiator which escape the impregnation has decreased to less than 50% by weight of the original amount thereby inducing copolymerization of the vinyl monomer and the radically (co)polymerization organic peroxide in the propylene polymer and consequent formation of a graft precursor resin composition, and f. melting the graft precursor resin composition or a mixture of 1 to less than 100% by weight of the graft precursor resin composition with less than 99% by weight of at least one polymer selected from the group consisting of propylene polymers and vinyl polymers at a temperature in the range of 100 to 300° C. and kneading the resultant melted mass thereby inducing graft reaction thereof.

DETAILED DESCRIPTION OF THE PREFERRED EMBODIMENTS

Now, the present invention will be described in detail below.

The propylene polymer to be used for the production of the graft precursor of the present invention embraces propylene homopolymer and copolymers having propylene as a main component and additionally containing other α-olefins or polar ethylenically unsaturated monomers (desirably containing at least 75% by weight of propylene).

Concrete examples of the propylene polymer include isotactic polypropylene, crystalline propylene-ethylene random copolymer, crystalline propylene-ethylene block copolymer, crystalline propylene-butene-1 random copolymer, and maleic anhydride-modified polypropylene.

Optionally, two or more such propylene polymers may be used together in a mixed state.

Desirably, the propylene polymer is used in the form of a powder or pellets having a particle diameter approximately in the range of 0.1 to 5 mm. If the particle diameter is excessively large, the propylene polymer is dispersed only with difficulty at the time of polymerization and the time required for the impregnation of the vinyl monomer with the propylene polymer, for example, is intolerably long. If the particle diameter is excessively small, the propylene polymer and the vinyl monomer will dissolve in each other when the vinyl polymer impregnates the propylene polymers, with the result that dispersion of the propylene polymer in the suspension is poor and that separation and washing of the graft precursor following the reaction cannot be carried out easily.

The propylene polymer is suspended in water and used as a propylene polymer suspension in the present invention.

The vinyl monomer to be used for the production of the graft precursor in the present invention is specifically a vinyl aromatic monomer. Concrete examples of the vinyl aromatic monomer are styrene; nuclear-substituted styrenes such as methyl styrene, dimethyl styrene, ethyl styrene, isopropyl styrene, and chlorostyrene; α-substituted styrenes such as α-methyl styrene and α-ethyl styrene; (meth)acrylic ester monomers such as alkyl ($C_{1-7}$) esters of (meth)acrylic acids; (meth)acrylonitriles, and vinyl ester monomers such as vinyl acetate and vinyl propionate.

Other examples of the vinyl monomers usable herein include other vinyl type monomers such as vinyl and vinylidene halogenides (particularly vinyl chloride and vinylidene chloride), vinyl naphthalene, vinyl carbazole, acrylamide, methacrylamide, and maleic anhydride. One member or a mixture of two or more members selected from the group of vinyl monomers cited above can be used.

Among the vinyl monomers cited above, vinyl aromatic monomers and (meth)acrylic ester monomers prove to be particularly desirable. The vinyl monomer functions particularly advantageously in this invention when it contains such a vinyl aromatic monomer or (meth)acrylic ester monomer as mentioned above in a ratio of at least 50%. When the vinyl monomer to be used happens to be a hydrophilic or solid substance, it is desired to be used as dissolved in an oil-soluble monomer. As regards the production of the graft precursor, the amount of the vinyl monomer contained in the produced aqueous suspension is in the range of 5 to 400 parts by weight, preferably 10 to 200 parts by weight, based on 100 parts by weight of the propylene polymer.

If this amount is less than 5 parts by weight, there ensues an undesirable phenomenon that the product of the grafting reaction, despite the high grafting efficiency possessed thereby, manifests the function of a product of grafting only with difficulty.

If this amount exceeds 400 parts by weight, there similarly ensues an undesirable phenomenon that the amount of the vinyl monomer, the radically (co)polymerizable organic peroxide represented by the general formula (I) or (II), and the radical polymerization initiator which escapes impregnating the propylene polymer comes to exceed 50% by weight and the amount of the free vinyl homopolymer increases proportionately.

The specification of Japanese Patent Publication SHO 58(1983)-53003 states that the aqueous suspension polymerization method requires the content of the free vinyl type monomer to be less than 20% by weight. The graft precursor which is used in the present invention, however, exhibits a sufficiently high grafting efficiency even when the total amount of the free vinyl monomer, the radially (co)polymerizable organic peroxide, and the radical polymerization initiator exceeds 20% by weight, providing that this total amount is less than 50% by weight, because the vinyl homopolymer contains a peroxy group in the molecular unit thereof.

The radically (co)polymerizable organic peroxide to be used for the production of the graft precursor in the present invention is a compound represented by the aforementioned general formula (I) or (II).

Concrete examples of the compound represented by the general formula (I) include t-butyl peroxyacryloyloxyethyl carbonate, t-amyl peroxyacryloyloxyethyl carbonate, t-hexyl peroxyacryloyloxyethyl carbonate, 1,1,3,3-tetramethylbutyl peroxyacryloyloxyethyl carbonate, cumyl peroxyacryloyloxyethyl carbonate, p-isopropylcumyl peroxyacryloyloxyethyl carbonate, t-butyl peroxymethacryloyloxyethyl carbonate, t-amyl peroxymethacryloyloxyethyl carbonate, t-hexyl peroxymethacryloyloxyethyl carbonate, 1,1,3,3-tetramethylbutyl peroxymethacryloyloxyethyl carbonate, cumyl peroxymethacryloyloxyethyl carbonate, p-isopropylcumyl peroxymethacryloyloxyethyl carbonate, t-butyl peroxyacryloyloxyethoxyethyl carbonate, t-amyl peroxyacryloyloxyethoxyethyl carbonate, t-hexyl peroxyacryloyloxyethoxyethyl carbonate, 1,1,3,3-tetramethylbutyl peroxyacryloyloxyethoxyethyl carbonate, cumyl peroxyacryloyloxyethoxyethyl carbonate, pisopropylcumyl peroxyacryloyloxyethoxyethyl carbonate, t-butyl peroxymethacryloyloxyethoxyethyl carbonate, t-amyl peroxymethacryloyloxyethoxyethyl carbonate, t-hexyl peroxymethacryloyloxyethoxyethyl carbonate, 1,1,3,3-tetramethylbutyl peroxymethacryloyloxyethoxyethyl carbonate, cumyl peroxymethacryloyloxyethoxyethyl carbonate, p-isopropylcumyl peroxymethacryloyloxyethoxyethyl carbonate, t-butyl peroxyacryloyloxyisopropyl carbonate, t-amyl peroxyacryloyloxyisopropyl carbonate, t-hexyl peroxyacryloyloxyisopropyl carbonate, 1,1,3,3-tetramethylbutyl peroxyacryloyloxyisopropyl carbonate, cumyl peroxyacryloyloxyisopropyl carbonate, pisopropylcumyl peroxyacryloyloxyisopropyl carbonate, t-butyl peroxymethacryloyloxyisopropyl carbonate, t-amyl peroxymethacryloyloxyisopropyl carbonate, t-hexyl peroxymethacryloyloxyisopropyl carbonate, 1,1,3,3-tetramethylbutyl peroxymethacryloyloxyisopropyl carbonate, cumyl peroxymethacryloyloxyisopropyl carbonate, and p-isopropylcumyl peroxymethacryloyloxyisopropyl carbonate.

Concrete examples of the compound represented by the general formula (II) include t-butyl peroxyallyl carbonate, t-amyl peroxyallyl carbonate, t-hexyl peroxyallyl carbonate, 1,1,3,3-tetramthylbutyl peroxyallyl carbonate, p-menthane peroxyallyl carbonate, cumyl peroxyallyl carbonate, t-butyl peroxymethallyl carbonate, t-amyl peroxymethallyl carbonate, t-hexyl peroxymethallyl carbonate, 1,1,3,3-tetramethylbutyl peroxymethallyl carbonate, p-methane peroxymethallyl carbonate, cumyl peroxymethallyl carbonate, t-butyl peroxyallyloxyethyl carbonate, t-amyl peroxyallyloxyethyl carbonate, t-hexyl peroxyallyloxyethyl carbonate, t-butyl peroxymethallyloxyethyl carbonate, t-amyl peroxymethallyloxyethyl carbonate, t-hexyl peroxymethallyloxyethyl carbonate, t-butyl peroxyallyloxyisopropyl carbonate, t-amyl peroxyallyloxyisopropyl carbonate, t-hexyl peroxyallyloxyisopropyl carbonate, t-butyl peroxymethallyloxyisopropyl carbonate, t-amyl peroxymethallyloxyisopropyl carbonate, and t-hexyl peroxymethallyloxyisopropyl carbonate.

Among the radically (co)polymerizable organic peroxides enumerated above, t-butyl peroxyacryloyloxyethyl carbonate, t-butyl peroxymethacryloyloxyethyl carbonate, t-butyl peroxyallyl carbonate, and t-butyl peroxymethallyl carbonate, are particularly desirable for use in this invention. The reason for the preference for these compounds over the others is that they exhibit high solubility with respect to vinyl monomer and are chemically stable, and further that the activity of the radicals they produce is high so that excellent grafting property is manifested.

The amount of the radically (co)polymerizable organic peroxide to be used is in the range of 0.1 to 10 parts by weight based on 100 parts by weight of the vinyl monomer.

If this amount is less than 0.1 part by weight, there ensues an undesirable phenomenon that the produced graft precursor is deficient in the supply of the active oxygen and manifests and appreciable grafting property only with difficulty.

If the amount exceeds 10 parts by weight, there ensues an undesirable phenomenon that the polymeric organic peroxide decomposes and the graft precursor obtained in consequence of the polymerization forms a large amount of gel and even acquires an increased capacity for gel formation while enjoying an enhanced grafting efficiency.

The radical polymerization initiator to be used for the production of the graft precursor in the present invention has a decomposition temperature necessary for obtaining a half life of 10 hours (hereinafter referred to as "10-hour half-life temperature") in the range of 40° to 90° C., preferably 50° to 75° C. This is because the polymerization in this invention must be carried out under conditions incapable of decomposing the radically (co)polymerizable organic peroxide and the fact that the 10-hour half-life temperature of the radically (co)polymerizable organic peroxide falls in the range of 90° to 110° C. requires the polymerization temperature to be not higher than 110° C.

If the 10-hour half-life temperature of the radical polymerization initiator exceeds 90° C., there ensues an undesirable phenomenon that the polymerization temperature increases to the extent that the radically (co)polymerizable organic peroxide may be decomposed during the polymerization. If it is lower than 40° C., there ensues an undesirable phenomenon that the polymerization is initiated while the propylene polymer is being impregnated with the vinyl monomer and, as a consequence, the produced graft precursor suffers from a lack of homogeneity of composition. The term "10-hour half-life temperature" as used herein refers to the temperature at which the decomposition ratio of a given polymerization initiator reaches 50% after a sample containing the polymerization initiator in a concentration of 0.1 mol in 1 liter of benzene is left standing for 10 hours.

As concrete examples of the radical polymerization initiators which meet this requirement, there can be cited disisopropyl peroxy dicarbonate (40.5° C.), di-n-propyl peroxydicarbonate (40.5° C.), dimyristyl peroxydicarbonate (40.9° C.), di(2-ethoxyethyl) peroxydicarbonate (43.4° C.), di(methoxyisopropyl) peroxydicarbonate (43.5° C.), di(2-ethylhexyl) peroxycarbonate (43.5° C.), t-hexyl peroxyneodecanoate (44.7° C.), di(3-methyl-3-methoxybutyl) peroxydicarbonate (46.5° C.), t-butyl peroxyneodecanoate (46.5° C.), t-hexyl peroxyneohexanoate (51.3° C.), t-butyl peroxyneohexanoate (53° C.), 2,4-dichlorobenzoyl peroxide (53° C.), t-hexyl peroxypivalate (53.2° C.), t-butyl peroxypivalate (55° C.), 3,5,5-trimethylhexanoyl peroxide (59.5° C.), octanoyl peroxide (62° C.), lauroyl peroxide (62° C.), cumyl peroxyoctoate (65.1° C.), acetyl peroxide (68° C.), t-butylperoxy-2-ethyl hexanoate (72.5° C.) m-toluoyl peroxide (73° C.), benzoyl peroxide (74° C.), t-butylperoxy isobutylate (78° C.), and 1,1-bis(t-butylperoxy)-3,5,5-trimethyl cyclohexane (90° C.) (where the 10-hour half-life temperatures are shown in parentheses).

The amount of the radical polymerization initiator to be used is in the range of 0.01 to 5 parts by weight, preferably 0.1 to 2.5 parts by weight, based on 100 parts by weight of the total amount of the vinyl monomer and the radically (co)polymerizable organic peroxide.

If this amount is less than 0.01 parts by weight, there ensues an undesirable phenomenon that the polymerization of the vinyl monomer and the radically (co)polymerizable organic peroxide is not perfectly effected. If the amount exceeds 5 parts by weight, there ensues an undesirable phenomenon that the propylene polymer undergoes molecular severance during the polymerization and further the radically (co)polymerizable organic peroxide tends to undergo induced decomposition.

In the present invention, the production of the graft precursor is carried out by the method of aqueous suspension polymerization as generally practised. To be specific, a propylene suspension prepared by suspending the propylene polymer in water and a solution separately prepared by dissolving the radical polymerization initiator and the radically (co)polymerizable organic peroxide in the vinyl monomer are dispersed by stirring in water in the presence of a suspending agent usable for aqueous suspension polymerization such as, for example, a water-soluble polymer like polyvinyl alcohol, polyvinyl pyrrolidone, or methyl cellulose or a sparingly water-soluble inorganic substance like calcium phosphate, magnesium oxide. Although the concentration of the aqueous suspension to be used in this case is not critical, it is generally selected so that the amount of the components for the reaction falls in the range of 5 to 150 parts based on 100 parts by weight water.

In this case, the aforementioned impregnation of the propylene polymer with the solution is desired to be carried out at as high a temperature as permissible. If the radical polymerization initiator is allowed to decompose and initiate polymerization in the course of the impregnation, however, the produced graft precursor acquires a highly heterogeneous composition. The impregnation, therefore is desired to be performed at a temperature not less than 5° C. lower than the 10-hour half-life temperature of the radical polymerization initiator to be used.

Further, the impregnation should be carried out until the amount of the free vinyl monomer, the radically (co)polymerizable organic peroxide, and the radical polymerization initiator decreases to less than 50% by weight, preferably to less than 20% by weight, of the amount thereof initially used in this reaction. If the amount reached after the decrease is 50% by weight or over, there ensues an undesirable phenomenon that the graft precursor of the present invention is notably deficient in grafting efficiency. The total amount of the free vinyl monomer, the radically (co)polymerizable organic peroxide, and the radical polymerization initiator is found by taking a desired amount of the aqueous suspension as a sample, promptly passing the sample through a metallic gauze of about 300 mesh thereby separating the sample into a propylene polymer fraction and a liquid phase fraction, and determining the amounts of the vinyl monomer, and radically (co)polymerizable organic peroxide, and the radical polymerization initiator contained in the liquid phase fraction.

The polymerization for the production of the graft precursor is carried out generally at a temperature in the range of 30° to 110° C. This range of temperatures is aimed at preventing the radically (co)polymerizable organic peroxide from decomposition as much as possible.

If this temperature exceeds 110° C., and the polymerization time exceeds 5 hours there ensues an undesirable phenomenon that the amount of the decomposed radically (co)polymerizable organic peroxide increases intolerably. Properly the polymerization time falls generally in the range of 2 to 20 hours.

The graft precursor is produced as described above.

Then, the graft precursor is subjected, either by itself or in combination with either or both of the propylene polymer and the vinyl monomer, to grafting reaction.

First, the method for producing a graft resin composition by subjecting the graft precursor prepared as described above to the grafting reaction will be explained below.

The grafting reaction is effected by melting and kneading the graft precursor at a temperature in the range of 100° to 300° C. If this temperature is lower than 100° C., there ensues an undesirable phenomenon that the precursor is not melted enough to be easily kneaded and, at the same time, the decomposition of the radically (co)polymerizable organic peroxide requires an intolerably long time. If the temperature exceeds 300° C., there ensues an undesirable phenomenon that the graft precursor undergoes molecular severance (decomposition).

The present invention requires the kneading of the graft precursor for the purpose of maintaining the homogeneity of the graft resin composition as a product and controlling the particle diameter in the dispersed phase during the polymerization.

The dispersed phase tends to induce agglomeration of particles dispersed therein when the temperature of the grafting reaction exceeds 200° C. The kneading serves to preclude this agglomeration.

The time for the grafting reaction is generally not more than 1 hour, though it is variable with the temperature of the grafting reaction.

Now, the method for effecting the grafting reaction of the graft precursor in combination with the propylene polymer and the vinyl polymer will be described. The propylene polymer to be used in this case is the same substance as used for the preparation of the graft precursor. Preferably, it has the same monomer composition or melt flow rate as the propylene polymer which was used in the graft precursor. If the propylene polymer to be used has a different monomer composition or melt flow rate from the propylene polymer used in the graft precursor, there ensues an undesirable phenomenon that the kneading is not sufficiently effected and the produced graft resin composition may suffer from insufficient mechanical strength and poor appearance.

The vinyl polymer to be mixed with the graft precursor in the present invention is a polymer which is obtained by polymerizing at least one member selected from the group consisting of vinyl aromatic monomers such as styrene; nuclear-substituted styrenes such as methyl styrene, dimethyl styrene, ethyl styrene, isopropyl styrene, and chlorostyrene; $\alpha$-substituted styrenes such as $\alpha$-methyl styrene and $\alpha$-ethyl styrene; (meth)acrylic ester monomers such as alkyl ($C_{1-7}$) esters of (meth)acrylic acids; (meth)acrylonitriles; and vinyl ester monomers such as vinyl acetate and vinyl propionate. Desirably, this vinyl polymer has the same monomer composition as the vinyl polymer formed in the graft precursor. If it has a different monomer composition, there ensues an undesirable phenomenon that it is not sufficiently kneaded with the graft precursor and, as the result, the produced graft resin composition may have insufficient mechanical strength and poor appearance.

The production of the graft resin composition is accomplished in accordance with this method by mixing 1 to less than 100% by weight of the graft precursor with less than 99% by weight of the aforementioned polymer thereby inducing the grafting reaction in the same manner as mentioned above. If the amount of the graft precursor used in this mixing is less than 1% by weight and that of the polymer not less than 99% by weight, there ensues an undesirable phenomenon that the amount of the graft formed in the produced graft resin composition is not sufficient and the graft resin composition suffers as from layer separation.

Particularly desirably, the amount of the graft precursor to be used for the production of the graft resin composition is in the range of 10 to 90% by weight and that of the polymer to be mxied therewith in the range of 90 to 10% by weight. This is because the particles in the dispersed phase tend to become unduly large in spite of their thoroughness of dispersion if the amount of the graft precursor is less than 10% by weight.

In accordance with the present invention, the graft resin composition is obtained quickly and easily by the use of the conventional kneading machine and the mixing ratio of the two components can be changed simply by changing the ratio of the amounts of the components used for the mixing. Further the graft resin composition to be obtained by the present invention has a high graft content as compard with the countertype obtained by the conventional method and, therefore, entails the agglomeration of the vinyl polymer only sparingly during the secondary fabrication. Thus, the present invention produces a graft resin composition which is useful as adhesive agent, coating material, modifying agent, micro-dispersion auxiliary, polymer alloying agent, functional molding material, and macromolecular compatibility-imparting agent, for example.

Now, the present invention will be described more specifically below with reference to working examples and comparative experiments.

EXAMPLE 1

In a stainless steel autoclave having an inner volume of 5 liters, 2.5 g polyvinyl alcohol was dissolved as a suspending agent in 2,500 g of purified water. In the resultant solution, 700 g of propylene polymer pellets having a melt flow rate of 8.0 g/10 minutes (produced by Sumitomo Chemical Co., Ltd. and marketed under tradename of "Sumitomo Noblen W-101") were dispersed by stirring. Separately, 1.5 g of benzoyl peroxide as a radical polymerization initiator having a 10-hour half-life temperature of 74° C. (produced by Nippon Oil & Fats Co., Ltd. and marked under tradename of "Nyper B") and 6 g of t-butyl peroxymethacryloyloxyethyl carbonate as a radically (co)polymerizable organic peroxide were dissolved in 300 g of styrene as a vinyl monomer. The solution was added to and stirred in the contents of the autoclave. Then, the contents of the autoclave were heated to 60° to 65° C. and stirred for two hours to effect impregnation of the propylene polymer with the vinyl monomer containing the radical polymerization initiator and the radically (co)polymerizable organic peroxide. When the total amount of the free vinyl monomer, the radically (co)polymerizable organic peroxide, and the radical polymerization initiator was confirmed to have decreased to less than 50% by weight of the initial total amount thereof, the contents of the autoclave were heated to 80° to 85° C. and held at this temperature for 7 hours for completion of the polymerization. The mass obtained in the autoclave was washed with water and then dried to obtain a graft precursor.

The following experiment was carried out on the obtained graft precursor to determine the amount of polyoxy-radical bound to the styrene type polymer and to confirm that no grafting reaction had occurred in the graft precursor.

This graft precursor was extracted with ethyl acetate at room temperature for 7 days, to obtain a styrene polymer solution. This solution was placed in methanol to precipitate a white powdery propylene-styrene polymer. By iodometry, this polymer was found to possess an active oxygen content of 0.13% by weight. Then the residue after the extraction with the ethyl acetate was extracted with a Soxhlet extractor using xylene and it was found to have no xylene insoluble content.

Then, in a mixer (produced by Toyo Seiki Seisakusho K.K. and marketed under tradename of "Laboplastomill B-75"), said graft precursor was kneaded at 180° C. at a rotational speed of 50 r.p.m. for 10 minutes to effect a grafting reaction and produce a graft resin composition. When a sample of this graft resin composition was extracted with a Soxhlet extractor using ethyl acetate, it was found to contain 9.8% by weight, based on the total amount of the composition, of styrene polymer which had escaped the grafting. Thus, the grafting efficiency of the styrene polymer was found by calculation to be 67.3% by weight. When a sample of the graft resin composition was extracted with xylene, it was found to have a xylene insoluble content of 10.3% by weight. (The grafting efficiency refers to the ratio of the amount of the grafted styrene polymer to the amount of the total styrene polymer.)

EXAMPLES 2 TO 4

Graft resin compositions were obtained by following the procedure of Example 1, except that the kneading temperature of the graft precursor was changed as indicated in Table 1. The graft resin compositions were tested to the grafting efficiency of styrene polymer component and for the xylene insoluble content. The results were as shown in Table 1.

TABLE 1

|  | Example No. | | | |
| --- | --- | --- | --- | --- |
|  | 1 | 2 | 3 | 4 |
| Kneading temperature (°C.) | 180 | 140 | 220 | 260 |
| Grafting efficiency of styrene polymer component (in % by weight) | 67.3 | 45.8 | 62.7 | 56.3 |
| Xylene insoluble content (in % by weight) | 10.3 | 4.2 | 22.6 | 21.7 |

EXAMPLE 5

A graft resin composition was produced by following the procedure of Example 1, except that the kneading machine was changed from the mixer "Laboplastomill B-75" to a Banbury mixer (produced by Toyo Seiki Seisakusho K.K.). The graft resin composition was found to have a grafting efficiency (of styrene polymer component) of 70.1% by weight and a xylene insoluble content of 8.5% by weight.

EXAMPLE 6

A graft resin composition was produced by following the procedure of Example 1, except that the kneading machine was changed to a single screw extruder. The resin composition was found to have a grafting efficiency (of styrene polymer content) of 62.4% by weight and a xylene insoluble content of 12.5% by weight.

EXAMPLE 7

A graft precursor was prepared and a graft resin composition was produced by following the procedure of Example 1, except that the amount of propylene polymer was changed to 500 g, that of benzoyl peroxide to 2.5 g, that of t-butyl peroxymethacryloyloxyethyl carbonate to 10 g, and that of styrene to 500 g respectively. The resin composition was found to have a grafting efficiency (of styrene polymer component) of 65.3% by weight and a xylene insoluble content of 19.1% by weight.

EXAMPLE 8

A graft precursor was prepared and a graft resin composition was produced by following the procedure of Example 1, except that 300 g of methyl methacrylate was used in the place of 300 g of styrene. The resin composition was found to have a grafting efficiency (of methyl methacrylate polymer component) of 59.2% by weight and a xylene insoluble content of 5.7% by weight.

EXAMPLE 9

A graft precursor was prepared and a graft resin composition was produced by following the procedure of Example 1, except that a mixed monomer consisting of 210 g of styrene and 90 g of acrylonitrile was used in the place of 300 g of styrene. The resin composition was found to have a grafting efficiency (of styrene-acrylonitrile copolymer component) of 51.0% by weight and a xylene insoluble content of 12.6% by weight.

EXAMPLE 10

A graft precursor was prepared and a graft resin composition was produced by following the procedure of Example 1, except that a mixed monomer consisting of 210 g of styrene and 90 g of n-butyl acrylate was used in the place of 300 g of styrene. The resin composition was found to have a grafting efficiency (of styrene-n-butyl acrylate copolymer component) of 57.7% by weight and a xylene insoluble content of 15.0% by weight.

EXAMPLE 11

A graft precursor was prepared and a graft resin composition was produced by following the procedure of Example 1, except that 300 g of vinyl acetate was used in the place of 300 g of styrene and 6 g of t-butyl peroxyallyl carbonate in the place of 6 g of the t-butyl peroxymethacryloyloxyethyl carbonate. The resin composition was found to have a grafting efficiency (of vinyl acetate polymer component) of 62.3% by weight and a xylene insoluble content of 23.1% by weight.

EXAMPLE 12

A graft precursor was prepared and a graft resin composition was produced by following the procedure of Example 1, except that the propylene polymer was changed to a powdered propylene polymer (produced by Seitetsu Kagaku Co., Ltd. and marketed under tradename of "Floblen B-200"). The resin composition was found to have a grafting efficiency (of styrene polymer component) of 71.5% by weight and a xylene insoluble content of 8.9% by weight.

COMPARATIVE EXPERIMENT 1

When the graft precursor prepared by following the procedure of Example 1 was treated in a mixer of "Laboplastomill B-75" at 90° C. for one hour at a rotational speed of 50 r.p.m., it failed to dissolve and could not be kneaded. By the test performed following the procedure of Example 1, what composition was obtaind was found to have a grafting efficiency of 4.2% by weight, a value indicating insufficiency of the reaction.

COMPARATIVE EXPERIMENT 2

A grafting reaction was carried out by following the procedure of Example 1, except that the grafting temperature was changed to 320° C. The graft precursor consequently obtained was decomposed and the resin assumed a color.

COMPARATIVE EXPERIMENT 3

A graft precursor was prepared and subjected to a grafting reaction by following the procedure of Example 1, except that the use of t-butyl peroxymethacryloyloxyethyl carbonate was omitted. The resultant resin composition was found to have a grafting ratio (of styrene polymer component) of 1.9% by weight and a xylene insoluble content of 0% by weight. The results clearly indicate the effect of the t-butyl peroxymethacryloyloxyethyl carbonate on grafting.

EXAMPLE 13

In a stainless steel autoclave having an inner volume of 5 liters, 2.5 g of polyvinyl alcohol was dissolved as a suspending agent in 2,500 g of purified water. In the resultant solution, 700 g of propylene polymer pellets having a melt flow rate of 8.0 g/10 minutes (produced by Sumitomo Chemical Co., Ltd. and marketed under tradename of "Sumitomo Noblen W-101") were dispersed by stirring. Separately, 1.5 g of benzoyl peroxide as a radical polymerization initiator having a 10-hour half-life temperature of 74° C. (produced by Nippon Oil & Fats Co., Ltd. and marketed under tradename of "Nyper B") and 6 g of t-butyl peroxymethacryloyloxyethyl carbonate as a radically (co)polymerizable organic peroxide were dissolved in 300 g of styrene as a vinyl monomer. The solution was added to and stirred in the contents of the autoclave. Then, the contents of the autoclave were heated to 60 to 65° C. and stirred for one hour, to effect impregnation of the propylene polymer with the vinyl monomer containing the radical polymerization initiator and the radically (co)polymerizable organic peroxide. Subsequently, after the total amount of the free vinyl monomer, the radically (co)-polymerizable organic peroxide, and the radical polymerization initiator was confirmed to have decreased to less than 50% by weight of the initial total amount, the contents of the autoclave were heated to 80° to 85° C. and held at this temperature for 7 hours to complete the polymerization. The mass consequently produced was washed with water and dried to obtain a graft precursor.

By iodometry, the styrene type polymer formed in the graft precursor was found to have an active oxygen content of 0.13% by weight. When a sample of the graft precursor was extracted with xylene by a Soxhlet extractor, it was found to have no xylene insoluble content.

Then, 50 g of the particles of the graft precursor and 50 g of propylene polymer was thoroughly mixed at room temperature. With a mixer (produced by Toyo Seiki Seisakusho K.K. and marketed under tradename of "Laboplastomill B-75"), this mixture was kneaded at 180° C. at a rotational speed of 50 r.p.m. for 10 minutes, to produce a graft resin composition. When this graft resin composition was extracted with ethyl acetate by a Soxhlet extractor for extraction of styrene type polymer which had escaped the grafting and consequent determination of the grafting efficiency of the styrene type polymer component, the styrene type polymer content was found to be 6.7% by weight based on the amount of the graft resin composition. Thus, the grafting efficiency of the styrene type polymer was found by calculation to be 44.7% by weight.

By extraction with xylene, the resin composition was found to have a xylene insoluble content of 8.9% by weight.

Subsequently, the graft resin composition was compression molded at 200° C. to produce a sheet 2 mm in thickness. This sheet was uniform in texture and white in color and showed no sign of phase separation.

When this sheet was broken, the section showed no sign of layer separation.

EXAMPLES 14 TO 17

Graft resin compositions were produced by following the procedure of Example 13, except that the mixing ratio of the graft precursor and the propylene polymer was changed as indicated in Table 2. The grafting efficiencies of styrene type polymer and the xylene insoluble contents in the graft resin compositions and the appearance of the sheets obtained by compression molding the resin compositions at 200° C. are shown in Table 2.

TABLE 2

| | | Example No. | | | | |
|---|---|---|---|---|---|---|
| | | 13 | 14 | 15 | 16 | 17 |
| Amount mixed (g) | Graft precursor | 50 | 95 | 75 | 25 | 5 |
| | Propylene polymer | 50 | 5 | 25 | 75 | 95 |
| Property (in % by weight) | Grafting efficiency of styrene type polymer | 44.7 | 58.2 | 50.5 | 45.1 | 52.5 |

TABLE 2-continued

| | | Example No. | | | | |
|---|---|---|---|---|---|---|
| | | 13 | 14 | 15 | 16 | 17 |
| | Xylene insoluble content | 8.9 | 10.5 | 9.0 | 5.3 | 2.9 |
| Appearance of pressed sheet | Phase separation | none | none | none | none | none |
| | Layer separation | none | none | none | none | none |

EXAMPLES 18 TO 20

Graft resin composition were produced by following the procedure of Example 13, except that the kneading temperature was changed as indicated in Table 3. The grafting efficiencies of styrene type polymer and the xylene insoluble contents in the graft resin compositions and the appearance of the sheets obtained by compression molding the resin compositions are shown in Table 3.

TABLE 3

| | | Example No. | | | |
|---|---|---|---|---|---|
| | | 13 | 18 | 19 | 20 |
| Kneading temperature (°C.) | | 180 | 140 | 220 | 260 |
| Properties (in % by weight) | Grafting efficiency of styrene type polymer | 44.7 | 23.5 | 51.8 | 38.0 |
| | Xylene insoluble content | 8.9 | 2.3 | 9.9 | 11.5 |
| Appearance of pressed sheet | Phase separation | none | none | none | none |
| | Layer separation | none | none | none | none |

EXAMPLE 21

A graft resin composition was produced by following the procedure of Example 13, except that the kneading machine was changed from the mixer of "Laboplastomill B-75" to a Banbury mixer (produced by Toyo Seiki Seisakusho K.K.). This graft resin composition was found to have a grafting efficiency (of styrene type polymer component) of 48.6% by weight and a xylene insoluble content of 8.2% by weight. A sheet produced by press molding the graft resin composition at 200° C. showed no sign of phase separation or layer separation.

EXAMPLE 22

A graft resin composition was produced by following the procedure of Example 13, except that the kneading machine was changed to a single screw extruder (produced by Toyo Seiki Seisakusho K.K.). The graft resin composition was found to have a grafting efficiency (of styrene type polymer component) of 41.3% by weight and a xylene insoluble content of 11.2% by weight. A sheet produced by compression molding the graft resin composition at 200° C. showed no sign of phase separation or layer separation.

EXAMPLE 23

A graft precursor was prepared by following the procedure of Example 13. Then a graft resin composition was produced by following the procedure of Example 13, except that 50 g of the particles of the graft precursor and 50 g of a styrene polymer as a vinyl polymer (produced by Mitsubishi Monsanto Chemical Co., Ltd. and marketed under tradename of "Diarex HF-55") were used instead. Since this graft resin composition was thought to have a styrene type polymer as the matrix thereof, it would be considered desirable to determine the grafting efficiency of the propylene polymer. Unfortunately, no proper means is available for this determination. Thus, the grafting efficiency of the styrene type polymer to the propylene polymer was determined by following the procedure of Example 13. As a result, the graft resin composition was found to have a grafting efficiency (of styrene type polymer component) of 12.5% by weight and a xylene insoluble content of 1.4% by weight. A sheet produced from the graft resin composition by following the procedure of Example 13 showed no sign of phase separation or layer separation.

EXAMPLES 24 TO 27

Graft resin compositions were produced by following the procedure of Example 23, except that the amounts of graft precursor and the styrene polymer to be mixed were changed as indicated in Table 4. The grafting efficiencies of styrene type polymer and the xylene insoluble contents in the graft resin compositions and the appearance of the sheets obtained by compression molding the resin compositions at 200° C. are shown in Table 4.

In Examples 26 and 27, when the styrene type polymer was assumed to form the matrix of composition, the grafting efficiency of the styrene type polymer to the propylene polymer was found by calculation to be low. The propylene polymer as the dispersed phase, however, was thought to be grafted at a fairly high efficiency to the styrene type polymer.

TABLE 4

| | | Example No. | | | | |
|---|---|---|---|---|---|---|
| | | 23 | 24 | 25 | 26 | 27 |
| Amount mixed (g) | Graft precursor | 50 | 95 | 75 | 25 | 5 |
| | Styrene polymer | 50 | 5 | 25 | 75 | 95 |
| Property (in % by weight) | Grafting efficiency of styrene type polymer | 12.5 | 40.4 | 32.1 | 7.6 | 0.9 |
| | Xylene insoluble content | 1.4 | 8.8 | 6.3 | 0.9 | 0.2 |
| Appearance of pressed sheet | Phase separation | none | none | none | none | none |
| | Layer separation | none | none | none | none | none |

EXAMPLES 28 TO 31

A graft precursor was prepared by following the procedure of Examples 13, except that the amount of the propylene polymer to be used was changed from 700 g to 500 g, that of styrene from 300 g to 500 g, that of benzoyl peroxide from 1.5 g to 2.5 g, and that of t-butyl peroxymethacryloyloxyethyl carbonate from 6 g to 1 g respectively. Then graft resin compositions were produced by following the procedure of Example 13, except that the amounts of the graft precursor, propylene polymer, and styrene polymer to be mixed were varies as indicated in Table 5. The grafting efficiencies of styrene type polymer and the xylene insoluble contents in the graft resin compositions and the appearance of the sheets obtained by compression molding the resin compositions at 200° C. are shown in Table 5.

TABLE 5

| | | Example No. | | | |
|---|---|---|---|---|---|
| | | 28 | 29 | 30 | 31 |
| Amount mixed (g) | Graft precursor | 30 | 30 | 20 | 20 |
| | Styrene polymer | 40 | 30 | 50 | 30 |
| | Propylene polymer | 30 | 40 | 30 | 50 |
| Property (in % by weight) | Grafting efficiency of styrene type polymer | 15.1 | 18.3 | 9.7 | 13.4 |
| | Xylene insoluble content | 3.1 | 3.3 | 1.9 | 1.5 |
| Appearance of pressed sheet | Phase separation | none | none | none | none |
| | Layer separation | none | none | none | none |

EXAMPLES 32 TO 36

A graft precursor was prepared by following the procedure of Examples 13, except that 300 g of methyl methacrylate was used in the place of 300 g of styrene and 0.6 g of n-dodecyl mercaptan was additionally used as a molecular weight regulator. Then, graft resin compositions were produced by following the procedure of Example 13, except that the amounts of the graft precursor, propylene polymer, and methyl methacrylate polymer (produced by Asahi Chemical Industry Co., Ltd. and marketed under tradename of "Delpet 50N") to be mixed were varied as indicated in Table 6. The results were as shown in Table 6.

TABLE 6

| | | Example No. | | | | |
|---|---|---|---|---|---|---|
| | | 32 | 33 | 34 | 35 | 36 |
| Amount mixed (g) | Graft precursor | 50 | 50 | 50 | 30 | 30 |
| | Methyl methacrylate polymer | 50 | | 25 | | 35 |
| | Propylene polymer | | 50 | 25 | 70 | 35 |
| Property (in % by weight) | Grafting efficiency of methyl methacrylate polymer | 13.2 | 45.7 | 24.1 | 45.3 | 14.1 |
| | Xylene insoluble content | 7.6 | 8.1 | 7.9 | 4.4 | 5.0 |
| Appearance of pressed sheet | Phase separation | none | none | none | none | none |
| | Layer separation | none | none | none | none | none |

EXAMPLES 37 TO 41

A graft precursor was prepared by following the procedure of Example 13, except that a mixed monomer consisting of 210 g of styrene, 90 g of acrylonitrile, and 0.6 g of n-dodecyl mercaptan as a molecular weight regulator was used in the place of 300 g of styrene. Separately, an acrylonitrile-styrene copolymer was obtained by placing a mixed solution consisting of 70 g of styrene, 30 g of acrylonitrile, 0.2 g of n-dodecyl mercaptan, and 0.5 g benzoyl peroxide in 500 g of an aqueous 1% polyvinyl alcohol solution and holding the resultant mixture at a temperature of 80° to 85° C. for seven hours to complete polymerization. Graft resin compositions were produced by following the procedure of Example 13, except that the amounts of the copolymer, the graft precursor mentioned above, the propylene polymer to be mixed were varied as indicated in Table 7. The results were as shown in Table 7.

TABLE 7

| | | Example No. | | | | |
|---|---|---|---|---|---|---|
| | | 37 | 38 | 39 | 40 | 41 |
| Amount mixed (g) | Graft precursor | 50 | 50 | 50 | 30 | 30 |
| | Acrylonitrile-styrene | 50 | | 25 | | 35 |

TABLE 7-continued

|  |  | Example No. | | | | |
|---|---|---|---|---|---|---|
|  |  | 37 | 38 | 39 | 40 | 41 |
| Property (in % by weight) | copolymer Propylene polymer |  | 50 | 25 | 70 | 35 |
|  | Grafting efficiency of acrylonitrile-styrene copolymer | 12.3 | 53.1 | 20.1 | 51.5 | 10.5 |
|  | Xylene insoluble content | 7.7 | 8.1 | 8.1 | 5.3 | 4.8 |
| Appearance of pressed sheet | Phase separation | none | none | none | none | none |
|  | Layer separation | none | none | none | none | none |

EXAMPLE 42

A graft precursor was prepared by following the procedure of Example 13, except that a mixed monomer consisting of 210 g of methyl methacrylate and 90 g of n-butyl acrylate was used in the place of 300 g of styrene. Then, a graft resin composition was produced by following the procedure of Example 13, except that 50 g of the graft precursor and 50 g of propylene polymer were used instead. The graft resin composition was found to have a grafting ratio (of methyl methacrylate-n-butyl acrylate copolymer component) of 49.5% by weight and a xylene insoluble content of 13.2% by weight. A sheet obtained by compression molding this graft resin composition by following the procedure of Example 13 showed no sign of phase separation or layer separation.

EXAMPLE 43

A graft precursor was prepared by following the procedure of Example 13, except that 300 g of vinyl acetate was used in the place of 300 g of styrene and 6 g of t-butyl peroxyallyl carbonate in the place of 6 g of t-butyl peroxymethacryloyloxyethyl carbonate. A graft resin composition was produced by following the procedure of Example 13, except that 50 g of the graft precursor mentioned above and 50 g of propylene polymer were used instead. The grafting efficiency was determined by following the procedure of Example 13, except that the solvent for extraction was changed from ethyl acetate to methanol. The graft resin composition was found to have a grafting ratio (of vinyl acetate polymer component) of 55.7% by weight and a xylene insoluble content of 19.3% by weight. A sheet obtained by compression molding the graft resin composition by following the procedure of Example 13 showed no sign of phase separation or layer separation.

EXAMPLE 44

A graft precursor was prepared by following the procedure of Example 13. A graft resin composition was produced by following the procedure of Example 13, except that 50 g of propylene polymer having a melt flow rate of 3.5 g/10 minutes (produced by Sumitomo Chemical Co., Ltd. and marketed as "Sumitomo Noblen H-501") was mixed with 50 g of the graft precursor instead. The graft resin composition was found to have a grafting efficiency (of styrene type polymer component) of 42.5% by weight and a xylene insoluble content of 8.1% by weight. A sheet obtained by compression molding the graft resin composition by following the procedure of Example 13 showed no sign of phase separation. In a broken surface of the sheet, slight layer separation was observed.

COMPARATIVE EXPERIMENT 4

A graft precursor was prepared by following the procedure of Example 13. Then, a graft resin composition was produced by following the procedure of Example 13, except that 0.5 g of the graft precursor was mixed with 50 g of propylene polymer and 49.5 g of the same styrene type polymer ("Dialex HF-55") as used in Example 23. The graft resin composition was found to have a grafting efficiency (of styrene type polymer component) of 0.2% by weight and a xylene insoluble content of 0.1% by weight. A sheet obtained by compression molding the graft resin composition by following the procedure of Example 13 showed a sign of phase separation. A broken surface of the sheet also showed a serious layer separation.

COMPARATIVE EXPERIMENT 5

A grafting reaction was carried out by following the procedure of Example 13, except that the kneading temperature of the graft precursor and the polymer was changed to 90° C. The mixture, however, could not be melted and kneaded because the kneading temperature was low.

COMPARATIVE EXPERIMENT 6

A grafting reaction was carried out by following the procedure of Example 13, except that the kneading temperature of the graft precursor and the polymer was changed to 320° C. In the course of the grafting reaction, the resin began to undergo decomposition. The resin composition consequently obtained assumed a brown color.

COMPARATIVE EXPERIMENT 7

A grafting reaction was carried out by following the procedure of Example 13, except that the use of t-butyl peroxymethacryloyloxyethyl carbonate was omitted in the production of a graft precursor. The graft resin composition was found to have a grafting efficiency (of styrene type polymer component) of 0.8% by weight and a xylene insoluble content of 0.1% by weight. A sheet obtained by compression molding the graft resin composition by following the procedure of Example 13 showed signs of phase separation. A broken surface of this sheet showed serious layer separation. The results clearly indicate the effect of t-butyl peroxymethacryloyloxyethyl carbonate as a radically (co)polymerizable organic peroxide on grafting.

What is claimed is:

1. A method for the production of a graft resin composition, characterized by the steps of:
   a. suspending a propylene polymer in water thereby obtaining a propylene polymer suspension,
   b. then dissolving in a vinyl monomer 0.1 to 10 parts by weight, based on 100 parts by weight of the vinyl monomer, of at least one member selected from the group consisting of radically (co)polymerizable organic peroxides represented by the formula:

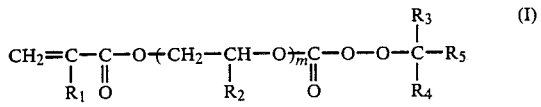

wherein R₁ stands for a hydrogen atom or an alkyl group of 1 or 2 carbon atoms, R₂ for a hydrogen atom or a methyl group, R₃ and R₄ independently for an alkyl group of 1 to 4 carbon atoms, R₅ for an alkyl group of 1 to 12 carbon atoms a phenyl group, or an alkyl-substituted phenyl group or a cycloalkyl group of 3 to 12 carbon atoms, and m for 1 or 2, and radically (co)polymerizable organic peroxides represented by the formula:

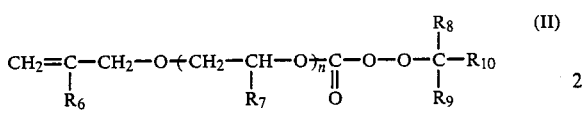

wherein R₆ stands for a hydrogen atom or an alkyl group of 1 to 4 carbon atoms, R₇ for a hydrogen atom or a methyl group, R₈ and R₉ independently for an alkyl group 1 to 4 carbon atoms, R₁₀ for an alkyl group of 1 to 12 carbon atoms, a phenyl group, or an alkyl-substituted phenyl group or a cycloalkyl group of 3 to 12 carbon atoms, and n for 0, 1, or 2, and 0.01 to 5 parts by weight, based on 100 parts by weight of the total said vinyl monomer and said radically (co)polymerizable organic peroxide, or a radical polymerization initiator possessing a half life of 10 hours and exhibiting a decomposition temperature in the range of 40° to 90° C., c. mixing resultant solution of b with said propylene polymer suspension in a ratio of 5 to 400 parts by weight of said vinyl monomer to 100 parts by weight of said propylene polymer thereby forming an aqueous suspension, d. heating said aqueous suspension under conditions incapable of inducing substantial decomposition of said radical polymerization initiator thereby enabling said propylene polymer to be impregnated with said vinyl monomer, said radically (co)polymerizable organic peroxide, and said radical polymerization initiator, e. elevating the temperature of said aqueous suspension after the amount of said vinyl monomer, said radically (co)polymerizable organic peroxide, and said radical polymerization initiator which escape the impregnation has decreased to less than 50% by weight of the original amount thereby inducing the copolymerization of said vinyl monomer and said radically (co)polymerizable organic peroxide in said propylene polymer and consequent formation of a graft precursor, and f. melting and kneading said graft precursor at a temperature in the range of 100° to 300° C. thereby inducing a grafting reaction thereof.

2. The method according to claim 1, wherein said vinyl monomer is at least one member selected from the group consisting of vinyl aromatic monomers, (meth)acrylic ester monomers, (meth)acrylonitriles, and vinyl ester monomers.

3. The method according to claim 1, wherein said vinyl monomer comprises at least 50% by weight of a vinyl aromatic monomer.

4. The method according to claim 1, wherein said vinyl monomer comprises at least 50% by weight of a (meth)acrylic ester monomer.

5. The method according to claim 1, wherein said radically (co)polymerizable organic peroxide is at least one member selected from the group consisting of t-butyl peroxyacryloyloxyethyl carbonate, t-butyl peroxymethacryloyloxyethyl carbonate, t-butyl peroxyallyl carbonate, and t-butyl peroxymethallyl carbonate.

6. A method for the production of a graft resin composition, characterized by the steps of:

a. suspending a propylene polymer in water thereby obtaining a propylene polymer suspension, b. then dissolving in a vinyl monomer 0.1 to 10 parts by weight, based on 100 parts by weight of the vinyl monomer, of at least one member selected from the group consisting of radically (co)polymerizable organic peroxides represented by the formula:

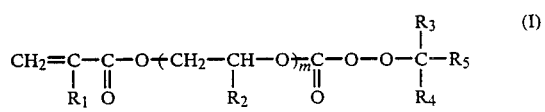

wherein R₁ stands for a hydrogen atom or an alkyl group of 1 or 2 carbon atoms,

R₂ for a hydrogen atom or a methyl group,

R₃ and R₄ independently for an alkyl group of 1 to 4 carbon atoms,

R₅ for an alkyl group of 1 to 12 carbon atoms, a phenyl group, or an alkyl-substituted phenyl group or a cycloalkyl group of 3 to 12 carbon atoms, and m for 1 or 2, and radically (co)polyermizable organic peroxides represented by the formula:

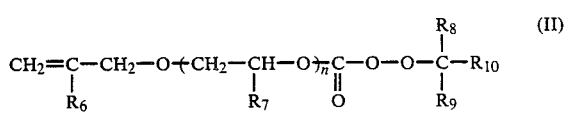

wherein

R₆ stands for a hydrogen atom or an alkyl group of 1 to 4 carbon atoms, R₇ for a hydrogen atom or a methyl group, R₈ and R₉ independently for an alkyl group of 1 to 4 carbon atoms, R₁₀ for an alkyl group of 1 to 12 carbon atoms, a phenyl group, or an alkyl-substituted phenyl group or a cycloalkyl group of 3 to 12 carbon atoms, and n for 0, 1, or 2, and 0.01 to 5 parts by weight, based on 100 parts by weight of the total of said vinyl monomer and said radically (co)polymerizable organic peroxide, of a radical polymerization initiator possessing a half life of 10 hours and exhibiting a decomposition temperature in the range of 40° to 90° C., c. mixing resultant solution of b with said propylene polymer suspension in a ratio of 5 to 400 parts by weight of said vinyl monomer to 100 parts by weight of said propylene polymer thereby forming an aqueous suspension, d. heating said aqueous suspension under conditions incapable of inducing substantial decomposition of said radical polymerization initiator thereby enabling said propylene polymer to be impregnated with said vinyl monomer, said radically (co)polymerizable organic peroxide, and said radical polymerization initiator, e. elevating the temperature of said aqueous suspension after the amonnt of said vinyl monomer, said radically (co)polymerizable organic peroxide, and said radical polymerization initiator which escape the impregnation has decreased to less than 50% by weight of the original amount thereby including copolymerization of said vinyl monomer and said radically (co)polymerizable organic peroxide in said propylene polymer and consequent formation of a graft precursor, f. mixing 1 to less than 100% by weight of said graft precursor with less than 99% by weight of at least one polymer selected from the group consisting of propylene polymers and vinyl polymers, and g. melting and kneading the resultant mixture at a temperature in the range of 100° to 300° C. thereby inducing a grafting reaction thereof.

7. The method according to claim 6, wherein said vinyl polymer is at least one member selected from the group consisting of vinyl aromatic monomers, (meth)acrylic ester monomers, (meth)acrylonitriles, and vinyl ester monomers.

8. The method according to claim 6 or claim 7, wherein the monomer composition of said propylene polymer to be mixed with said graft precursor is identical with the monomer composition of a propylene polymer to be used in the production of said graft precursor.

9. The method according to any of claims 6 or claim 7, wherein the melt flow rate of said propylene polymer to be mixed with said graft precursor is identical with the melt flow rate of a propylene polymer to be used in the production of said graft precursor.

10. The method according to any of claims 6 or claim 7, wherein the monomer composition of said vinyl polymer to be mixed with said graft precursor is identical with the monomer composition of a vinyl polymer in said graft precursor.

11. The method according to any of claims 6 or claim 7, wherein at least 50% by weight of a monomer constituting the vinyl polymer to be used in the production of said graft precursor is a vinyl aromatic monomer.

12. The method according to any of claims 6 or claim 7, wherein at least 50% by weight of the monomer constituting the vinyl polymer to be used in the production of said graft precursor is a (meth)acrylic ester monomer.

* * * * *